United States Patent
Clayton et al.

(10) Patent No.: US 10,643,106 B2
(45) Date of Patent: *May 5, 2020

(54) SYSTEM AND METHOD FOR PROCEDURALLY SYNTHESIZING DATASETS OF OBJECTS OF INTEREST FOR TRAINING MACHINE-LEARNING MODELS

(71) Applicant: Nvidia Corporation, Santa Clara, CA (US)

(72) Inventors: Jesse Clayton, Santa Clara, CA (US); Vladimir Glavtchev, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,547

(22) Filed: May 15, 2018

(65) Prior Publication Data

US 2018/0260662 A1 Sep. 13, 2018

Related U.S. Application Data

(63) Continuation of application No. 15/043,697, filed on Feb. 15, 2016, now Pat. No. 9,996,771.

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00221* (2013.01); *G06K 9/00335* (2013.01);
(Continued)

(58) Field of Classification Search
CPC ............ G06K 9/00221; G06K 9/6256; G06K 9/0061; G06K 9/6292; G06K 9/00228;
(Continued)

(56) References Cited

U.S. PATENT DOCUMENTS 6,421,458 B2   7/2002   Michael et al.
6,578,017 B1 *  6/2003   Ebersole .................. G06T 7/00
                                                706/3

(Continued)

FOREIGN PATENT DOCUMENTS

GB           2357412     *    6/2001

OTHER PUBLICATIONS

Kuchinskas, Susan, "Crash Course: Training the Brain of a Driverless Car"; http://www.scientificamerican.com/article/autonomous-driverless-car-brain/; dated Apr. 11, 2013, 3 pages.

(Continued)

*Primary Examiner* — Manav Seth

(57) ABSTRACT

A system and method for procedurally synthesizing a training dataset for training a machine-learning model. In one embodiment, the system includes: (1) a training designer configured to describe variations in content of training images to be included in the training dataset and (2) an image definer coupled to the training designer, configured to generate training image definitions in accordance with the variations and transmit the training image definitions: to a 3D graphics engine for rendering into corresponding training images, and further to a ground truth generator for generating associated ground truth corresponding to the training images, the training images and the associated ground truth comprising the training dataset.

20 Claims, 2 Drawing Sheets

(51) Int. Cl.
*G06T 15/00* (2011.01)
*G06K 9/66* (2006.01)
*G06N 5/04* (2006.01)
*G06N 20/00* (2019.01)

(52) U.S. Cl.
CPC ..... *G06K 9/00369* (2013.01); *G06K 9/00805* (2013.01); *G06K 9/00825* (2013.01); *G06K 9/6255* (2013.01); *G06K 9/6292* (2013.01); *G06K 9/66* (2013.01); *G06N 5/046* (2013.01); *G06N 20/00* (2019.01); *G06T 15/005* (2013.01)

(58) Field of Classification Search
CPC .......... G06K 9/00664; G06K 9/00671; G06K 2009/00738; G06K 9/00335; G06K 9/00624; G06K 9/0063; G06K 9/00805; G06K 9/00825; G06K 9/46; G06K 9/66; G06K 9/6267; G06T 2207/20016; G06T 2207/20081; G06T 7/33; G06T 15/005; G06N 5/046; G06N 99/005; G06N 7/005; G09B 23/30; Y10S 707/99931; Y10S 707/99933
See application file for complete search history.

(56) References Cited

U.S. PATENT DOCUMENTS

| | | | | |
|---|---|---|---|---|
| 6,947,597 | B2 * | 9/2005 | Lin | G06K 9/00456 |
| | | | | 382/156 |
| 7,212,665 | B2 | 5/2007 | Yang et al. | |
| 7,853,072 | B2 * | 12/2010 | Han | G06K 9/4642 |
| | | | | 382/103 |
| 7,924,146 | B2 | 4/2011 | Seder et al. | |
| 8,019,702 | B1 * | 9/2011 | Gargi | G06K 9/00523 |
| | | | | 706/12 |
| 8,379,994 | B2 | 2/2013 | Dai et al. | |
| 8,422,797 | B2 | 4/2013 | Heisele et al. | |
| 8,422,994 | B2 | 4/2013 | Rhoads et al. | |
| 8,649,606 | B2 | 2/2014 | Zhao et al. | |
| 8,774,515 | B2 | 7/2014 | Mensink et al. | |
| 8,813,111 | B2 | 8/2014 | Guerin et al. | |
| 8,861,870 | B2 * | 10/2014 | Shotton | G06K 9/00335 |
| | | | | 382/103 |
| 8,971,581 | B2 | 3/2015 | Wu et al. | |
| 9,031,317 | B2 | 5/2015 | Yakubovich et al. | |
| 9,111,349 | B2 | 8/2015 | Szeliski et al. | |
| 9,183,466 | B2 | 11/2015 | Siskind et al. | |
| 9,183,560 | B2 * | 11/2015 | Abelow | G06Q 10/067 |
| 9,208,405 | B2 | 12/2015 | Dai et al. | |
| 9,275,308 | B2 | 3/2016 | Szegedy et al. | |
| 9,373,033 | B2 | 6/2016 | Chan et al. | |
| 9,594,983 | B2 | 3/2017 | Alattar et al. | |
| 9,665,802 | B2 * | 5/2017 | Wang | G06K 9/66 |
| 9,870,624 | B1 * | 1/2018 | Narang | G06T 7/521 |
| 9,996,771 | B2 * | 6/2018 | Clayton | G06K 9/00369 |
| 10,078,727 | B2 * | 9/2018 | Wu | G06F 19/321 |
| 10,139,279 | B2 * | 11/2018 | Pluvinage | G01J 3/2823 |
| 2007/0031028 | A1 * | 2/2007 | Vetter | G06K 9/00208 |
| | | | | 382/154 |
| 2011/0249023 | A1 * | 10/2011 | Nakamura | G06T 19/00 |
| | | | | 345/619 |
| 2012/0207371 | A1 * | 8/2012 | Wakai | G06F 19/321 |
| | | | | 382/131 |
| 2014/0079314 | A1 | 3/2014 | Yakubovich et al. | |
| 2015/0339570 | A1 * | 11/2015 | Scheffler | G06N 3/10 |
| | | | | 706/16 |
| 2017/0109611 | A1 | 4/2017 | Luo | |

OTHER PUBLICATIONS

Peng, et al.; "Learning Deep Object Detectors from 3D Models"; University of Massachusetts Lowell; arXiv:1412.7122v4 [cs.Cv]; Oct. 12, 2015; 9 pgs.

\* cited by examiner

SYSTEM AND METHOD FOR PROCEDURALLY SYNTHESIZING DATASETS OF OBJECTS OF INTEREST FOR TRAINING MACHINE-LEARNING MODELS

CROSS-REFERENCE TO RELATED APPLICATION

This application is a continuation of currently pending U.S. patent application Ser. No. 15/043,697, entitled "SYSTEM AND METHOD FOR PROCEDURALLY SYNTHESIZING DATASETS OF OBJECTS OF INTEREST FOR TRAINING MACHINE-LEARNING MODELS", filed on Feb. 15, 2016, commonly assigned with the present application, and incorporated herein by reference in its entirety.

TECHNICAL FIELD

This application is directed, in general, to machine vision and, more specifically, to the training of machine-learning models to perform machine vision.

BACKGROUND

Self-driving vehicles are beginning to be test-driven on public roads, but their records have been marred with (so far) minor incidents. One impediment to their widespread adoption is their occasional inability to recognize the objects surrounding them as they move. At the heart of the issue is the efficacy of the machine vision the vehicles employ to recognize surrounding objects.

Machine vision is carried out using machine learning models, which require training on large datasets of images featuring a particular "target" object of interest. For training to be effective, the datasets should be sufficiently large to feature enough examples of variations of the target object. Variations may be in terms of shape, size, color, perspective, and orientation, for example. In addition, the example images are annotated in a way that distinguishes the target object from the background or other objects in the scene.

In the automotive field, training an object detector (e.g., vehicle or pedestrian detector) requires tens of thousands of examples of the target object. The difficulty in obtaining the dataset is the large number of factors associated with gathering the images. Some of the factors include variations in the type of environment (urban, suburban or rural), weather conditions, lighting conditions, and perspectives of the target object. Gathering such a large dataset has conventionally required equipping a vehicle with one or more image capturing devices (e.g., a camera), recording equipment, and data storage.

Furthermore, for the gathered dataset to be useful for training it must be fully annotated. "Ground truth" selection of the target object in each image must be created, which guides the machine learning model in recognizing the object. Ground truth data includes various attributes of an object in a given scene such as, but not limited to, its position, size, occlusion level, presence within a group of other objects, and orientation.

All known current solutions require driving an equipped vehicle through the various environmental, weather, lighting, and perspective conditions necessary for obtaining a diverse dataset. The resulting images are then manually annotated with ground truth data for each image where the target object is present.

SUMMARY

One aspect provides a system for procedurally synthesizing a training dataset for training a machine-learning model. In one embodiment, the system includes: (1) a training designer configured to describe variations in content of training images to be included in the training dataset and (2) an image definer coupled to the training designer, configured to generate training image definitions in accordance with the variations and transmit the training image definitions: to a 3D graphics engine for rendering into corresponding training images, and further to a ground truth generator for generating associated ground truth corresponding to the training images, the training images and the associated ground truth comprising the training dataset.

The disclosure also provides another aspect of a system for procedurally synthesizing a training dataset for training a machine-learning model. In one embodiment, this system includes: (1) a first processor configured to generate training image definitions in accordance with variations in content of training images to be included in the training dataset, (2) a second processor configured to render corresponding training images from the training image definitions, and (3) a third processor configured to generate associated ground truth corresponding to the training images, the training images and the associated ground truth comprising the training dataset.

BRIEF DESCRIPTION

Reference is now made to the following descriptions taken in conjunction with the accompanying drawings, in which.

DETAILED DESCRIPTION

Figure 1:
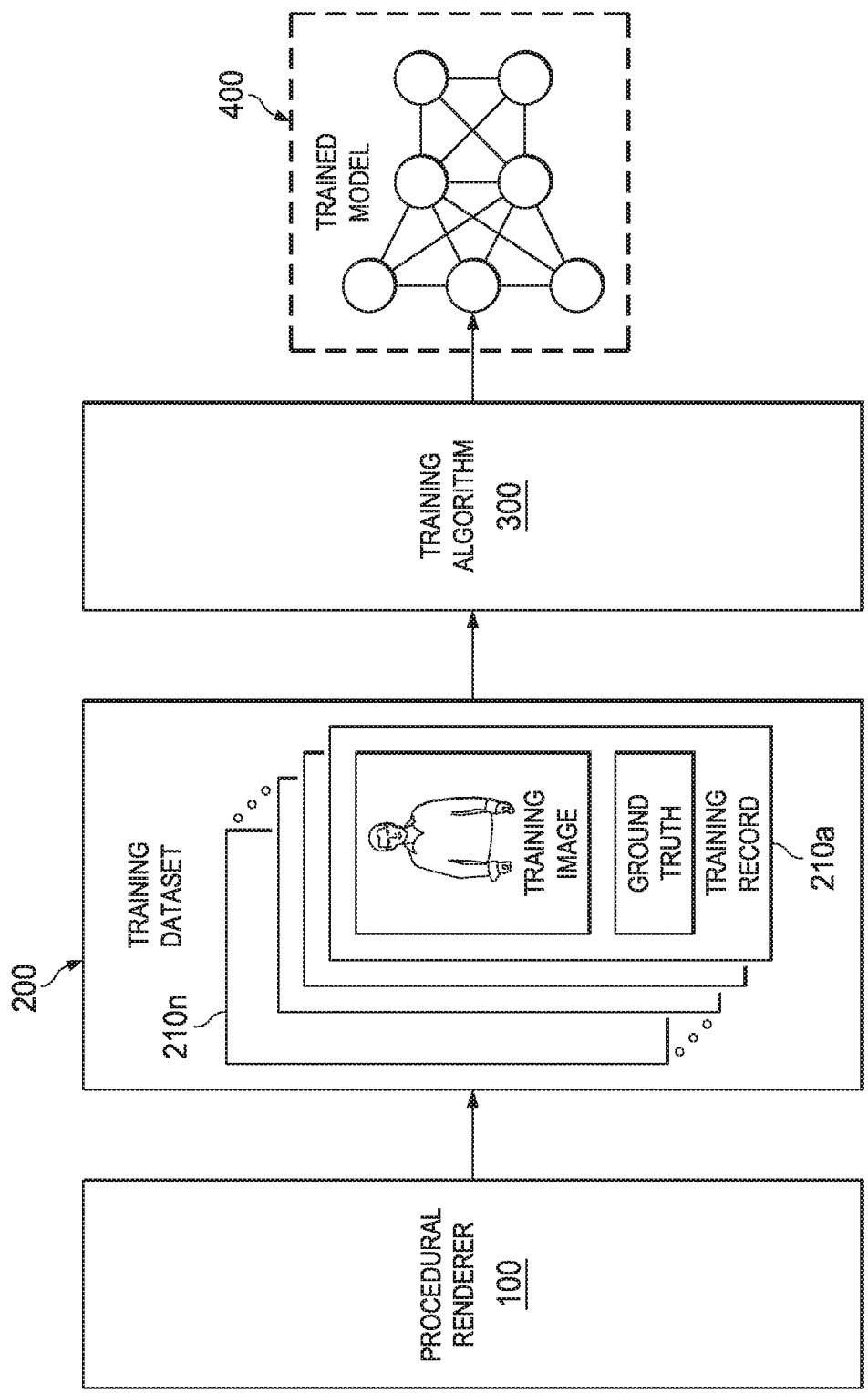
FIG. 1 is a diagram of one embodiment of a process by which a training dataset is created procedurally and a machine learning model is trained using the training dataset.

The laborious and sometimes inadequate conventional process for synthesizing a training dataset has been described in the Background above. It is recognized herein that a procedural technique for synthesizing a dataset can avoid the pitfalls of the conventional process and result in superior training. In an automotive context, superior training translates into superior machine vision, which usually translates into superior road safety. It is also recognized herein that the same information employed to render an image can be used to generate the ground truth that will be associated with the image in the training dataset.

Synthesizing a precise size of dataset covering all desired variations in the various attributes of an object (size, orientation, occlusion) for training purposes can be achieved far more efficiently than conventional manual techniques. The significance of that becomes apparent when using traditional data gathering methods to obtain a desired number of samples of a corner case situation. For example, gathering enough video footage of a woman carrying an umbrella while pushing a baby stroller in order to train a comprehensive pedestrian detector would require the collection of a large amount of data, much of which might include redundant data which has already been collected. Storage and data sorting implications of this approach could contribute significantly to the cost of the data gathering process. The systems and methods described herein can eliminate the extra cost by allowing the developer to specifically synthesize only as much data as is needed to complete the training of a model, e.g., a pedestrian detector. The systems and methods allow the flexibility of synthesizing these specific corner cases, while saving the developer many hours of work along the way.

Accordingly, introduced herein are various embodiments of systems and method for procedurally synthesizing a training dataset of images. The training dataset is made up of records that include images of objects of interest placed in the context of various backgrounds and perhaps other objects. The systems and methods also generate ground truth related to each of the images. The images mimic real-life images, and the ground truth accurately characterizes the images and objects therein, such that a diverse dataset is synthesized for the purpose of training a machine-learning model for carrying out machine vision. One significant advantage of a procedurally generated training data is that the distribution of scenarios and situations depicted in training images may be controlled. A dataset collected in the real world will almost invariably include many repetitive cases of the most common occurrences (pedestrians on sidewalks, for example), but rarer occurrences (so-called "corner cases") will not be equally represented (such as a woman pushing a stroller carrying an umbrella). Increasing the uniformity of the distribution of occurrences of the various scenarios and situations depicted in training images is likely to yield a more robustly trained model. In certain embodiments, the virtual world itself is procedurally generated. In other words, rather than just objects of different types in a virtual world of roads, the roads and buildings themselves can be procedurally generated. As those skilled in the pertinent art understand, a model is trained using a dataset and then tested using a dataset. The former and latter datasets are almost always different. For this reason, the former dataset may be called a "training dataset," and the latter dataset may be called a "testing dataset." However, the term "training dataset" will be used herein to denote a dataset used either for training or for testing, or both training and testing.

In certain embodiments to be illustrated and described herein, a three-dimensional (3D) graphics engine is employed to render the images. In particular embodiments, the 3D graphics engine is a conventional graphics engine, employable in other, conventional contexts, e.g., simulations or gaming. In other embodiments, the 3D graphics engine is a later-developed graphics engine. To operate as described herein, the 3D graphics engine would be programmed or scripted to generate the images, including objects of interest. To maximize the efficacy of real-world machine vision applications, virtual images would be created to reflect those that can be encountered in real-life. Any desired layout of a scene can be created using the 3D graphics engine, while certain rules would be enforced to prevent creation of scenes which could not occur in reality (e.g., a pedestrian floating in the air or a vehicle being inside a wall). Lighting conditions, weather, and other atmospheric phenomena can be simulated using various rendering techniques including raytracing for realism.

FIG. 1 is a diagram of one embodiment of a process by which a training dataset 200 is created procedurally and a machine learning model 400 is trained using the training dataset. As FIG. 1 shows, a procedural renderer 100 is employed to create the training dataset 200. The training dataset 200 has a plurality of training records 210a . . . 210n. In some embodiments, the plurality of training records 210a . . . 210n number in the millions. Each training record 210a . . . 210n includes at least a training image (unreferenced in FIG. 1) and associated ground truth (also unreferenced in FIG. 1).

A training algorithm 300 then employs the training dataset 200 to train a model. The model is trained iteratively, such that it learns to recognize objects of interest. As training proceeds, false positive and false negative recognitions diminish over time, typically until a threshold level of recognition ability is reached. The threshold level typically varies depending upon the field in which the trained model 400 is to be employed. In the automotive field, the threshold level would typically be set relatively high, due to the high cost of causing a mishap with a motor vehicle should its machine vision fail to operate as intended. The resulting model, a trained model 400, may then be deployed in a motor vehicle (not shown) or, more typically, replicated and deployed in multiple motor vehicles. For purposes of this disclosure, "motor vehicle" is defined not only to include vehicles powered by conventional gasoline or diesel-powered engines, but also vehicles powered by electric motors, gas or wind turbines or nuclear energy and hybrid vehicles powered by some combination of the same. Further, while the systems and methods described herein are useful for training models used in vehicles, they may also be useful for training models used in robots that employ machine vision to assess their surroundings.

Figure 2:
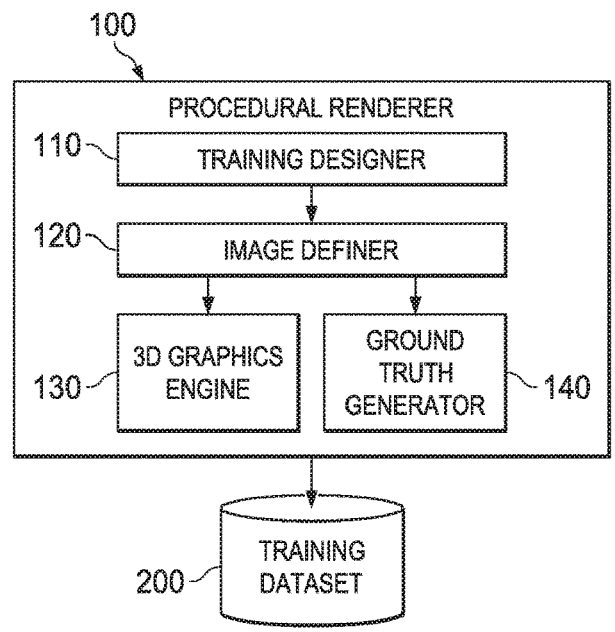
FIG. 2 is a block diagram of one embodiment of a procedural renderer that may be employed to create a training dataset.

FIG. 2 is a block diagram of one embodiment of the procedural renderer 100 of FIG. 1, which may be employed to create the training dataset 200 of FIG. 1. In the embodiment of FIG. 2, the procedural renderer 100 includes a training designer 110. In the illustrated embodiment, the training designer 110 is configured to describe variations in characteristics of the content of training images to be included in the training dataset 200. In one embodiment, the training designer is further configured to accept input from a user defining the characteristics and establishing limits of the variations in each of the characteristics. In one example embodiment, the characteristics include one or more of ambient lighting level, ambient lighting source location, size of the object of interest, location of the object of interest, color(s) of the object of interest, numbers of colors of the object of interest, numbers and types of other objects and types of background. Other embodiments include other characteristics.

Using the characteristics given in the example embodiment above, variations may be established as set forth in Table 1, below.

TABLE 1

Example Characteristics and Variations

| Characteristic | Variation |
| --- | --- |
| ambient lighting level | between 5% and 100% |
| ambient lighting source location | a rectangle bounded by [0, 0] and [200, 400] |
| size of object of interest | between 10% and 70% of image height |
| numbers of colors of the object of interest | between 1 and 4 |
| numbers of other objects | between 0 and 3 |
| types of other objects | nonmotorized vehicles (bicycles, tricycles and skateboards), personal objects (purses and umbrellas) and animals (pets and wild) and plants |

TABLE 1-continued

Example Characteristics and Variations

| Characteristic | Variation |
| --- | --- |
| types of background | flat terrain, mountainous terrain, highway and boulevard |

It will be apparent to those skilled in the pertinent art that just the characteristics and variations expressed in Table 1 could yield tens of thousands training image definitions, if not many more.

In the embodiment of FIG. 2, the procedural renderer 100 also includes an image definer 120. In the illustrated embodiment, the image definer 120 is coupled to the training designer 110 and configured to generate training image definitions (sometimes referred to herein as "scenes") in accordance with the variations described by the training designer 110.

In one embodiment, the training image definitions are expressed in a standard graphics language. The language may be a conventional language, such as OpenGL, Direct3D, Cg, VRML or Fran. In alternative embodiments, the training image definitions are expressed in a later-developed standard or proprietary graphics language. Those skilled in the pertinent art are familiar with 3D graphics languages and how they may be employed to describe images to be rendered in a graphics engine.

The product of the image definer 120, namely the training image definitions, is employed for two different, but related, purposes. Accordingly, in the illustrated embodiment, the image definer 120 is further configured to transmit the training image definitions to two destinations. First, the image definer 120 is configured to transmit the training image definitions to a 3D graphics engine 130 for rendering into corresponding training images. In one embodiment, the 3D graphics engine 130 is a conventional 3D graphics engine, such as one commercially available from Nvidia Corporation of Santa Clara, Calif. In an alternative embodiment, the 3D graphics engine 130 is a later-developed graphics engine. Second, the image definer 120 is configured to transmit the training image definitions further to a ground truth generator 140 for generating associated ground truth corresponding to the training images rendered by the 3D graphics engine 130. In a manner to be described in greater detail below, the ground truth generator 140 generates the ground truth corresponding to the rendered images.

The object of interest (e.g., a pedestrian, a traffic sign, or an animal) can be placed precisely at a desired location within a scene, and any or all other surrounding objects and background features can be tailored as desired. Procedural placement of the object of interest in a given scene facilitates the generation of the associated ground truth. Determining the position, lighting, level of occlusion, and other attributes of an object in a generated image from any perspective is possible using conventional techniques known to those skilled in the pertinent art. Obtaining the size and position of an object with respect to the camera is straightforward, since both the object and the camera's position in the virtual world are generated according to a set of user-specified rules. Occlusion and lighting of an object, which are highly dependent on the presence or absence of other objects in the scene, can be estimated with a high precision using conventional occlusion and light-ray tracing models.

In the illustrated embodiment, the ground truth associated with a particular image includes the coordinates locating an object of interest in the training image, which may be the center coordinates of the object or the coordinates of a rectangle bounding the object. Polar or other coordinates may alternatively be used. The ground truth may also include details about lighting, other objects in the image, the nature of the background or other attributes that may be useful in identifying the cause or nature of errors a model is making during training. Those skilled in the art will understand the scope of ground truth that may be generated procedurally given a scene defined for rendering.

In the embodiment of FIG. 2, the images rendered by the 3D graphics engine 130 and the ground truth generated by the ground truth generator 140 are corresponded and arranged into training records (i.e. the training records 210a . . . 210n of FIG. 1) and further assembled to yield the training dataset 200, as FIG. 2 shows. The training dataset 200 may then be employed as described in conjunction with FIG. 1.

It should be apparent to those skilled in the pertinent art that the image definer 120, the 3D graphics engine 130 and the ground truth generator 140 may operate in parallel counterparts to carry out their respective tasks on data in parallel. In the illustrated embodiment, no data dependence exists between any two given training images; further, no data dependence exists between their two associated sets of ground truth. Thus, the image definer 120 can generate multiple training image definitions in parallel and transmit the generated training images to the 3D graphics engine 130 and the ground truth generator 140 concurrently. Moreover, the 3D graphics engine 130 and the ground truth generator 140 can respectively render training images and generate associated ground truth in parallel. This allows the training dataset 200 to be generated relatively quickly and efficiently. In one embodiment, the 3D graphics engine 130 and the ground truth generator 140 are embodied using "cloud" (i.e. Internet-based) resources, such that significant parallel computing power may be brought to bear to render the training images and generate the associated ground truth.

Figure 3:
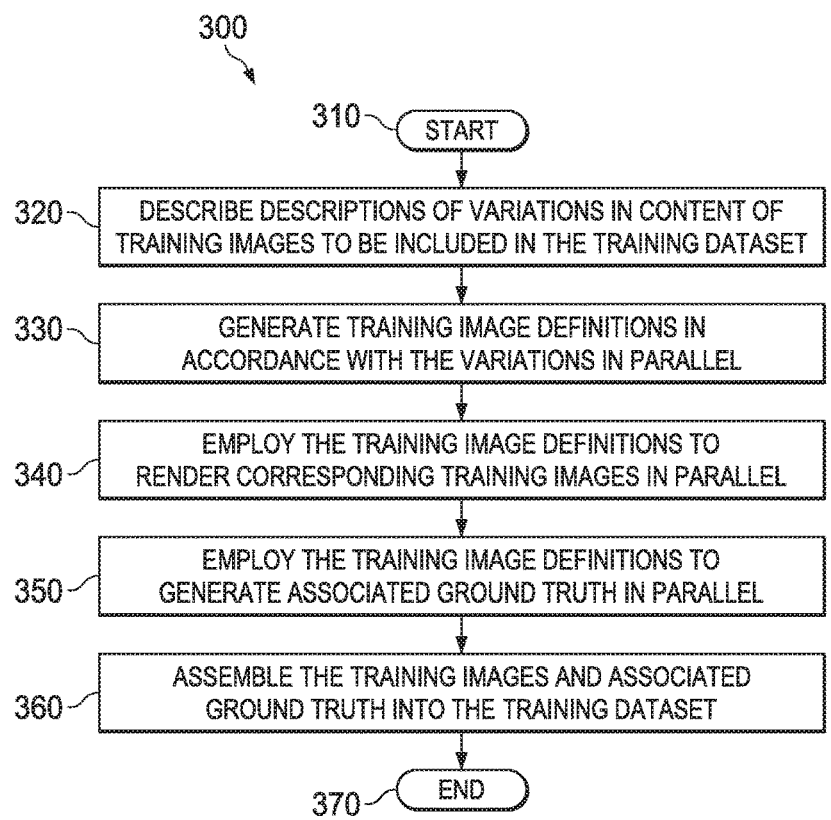
FIG. 3 is a flow diagram of one embodiment of a method of procedurally creating a training dataset.

FIG. 3 is a flow diagram of one embodiment of a method 300 of procedurally creating a training dataset. The method begins in a start step 310. In a step 320, variations in content of training images to be included in the training dataset are described. In a step 330, training image definitions in accordance with the variations are generated in parallel. In a step 340, the training image definitions are employed to render corresponding training images in parallel. In a step 350, the training image definitions are further employed to generate associated ground truth in parallel. In a step 360, the training images and associated ground truth are assembled into the training dataset. The method 300 ends in an end step 370.

Those skilled in the art to which this application relates will appreciate that other and further additions, deletions, substitutions and modifications may be made to the described embodiments.

What is claimed is:

1. A system for procedurally synthesizing a training dataset for training a machine-learning model, comprising:
    a training designer configured to describe variations in content of training images to be included in said training dataset; and
    an image definer coupled to said training designer, configured to generate training image definitions in accordance with said variations and transmit said training image definitions:
        to a 3D graphics engine for rendering into corresponding training images, and to a ground truth generator for generating, at least partially in parallel with the rendering by the 3D graphics engine, associated ground truth corresponding to said training images, said training images and said associated ground truth comprising said training dataset.

2. The system as recited in claim 1 wherein said training designer is further configured to accept input from a user establishing limits of said variations.

3. The system as recited in claim 1 wherein said training designer is further configured to refine said variations to eliminate variations that are physically impossible.

4. The system as recited in claim 1 wherein said training image definitions are expressed in a standard graphics language.

5. The system as recited in claim 1 wherein said 3D graphics engine is a conventional graphics engine.

6. The system as recited in claim 1 wherein said ground truth generator is further configured to generate said ground truth from said training image definitions expressed in a graphics language.

7. The system as recited in claim 1 wherein said ground truth includes coordinates locating an object of interest in said training images.

8. A system for procedurally synthesizing a training dataset for training a machine-learning model, comprising:
 a first processor configured to generate training image definitions in accordance with variations in content of training images to be included in said training dataset;
 a second processor configured to render corresponding training images from said training image definitions; and
 a third processor configured to generate, from said training image definitions and at least partially in parallel with said render of said second processor, associated ground truth corresponding to said training images, said training images and said associated ground truth comprising said training dataset.

9. The system as recited in claim 8 further comprising a computer configured to accept input from a user establishing limits of said variations, describe said variations, and transmit said training image definitions to said first processor.

10. The system as recited in claim 9 wherein said computer is further configured to refine said variations to eliminate variations that are physically impossible.

11. The system as recited in claim 8 wherein said first processor generates said training image definitions in a 3D graphics language employable by 3D graphics engine.

12. The system as recited in claim 8 wherein said second processor employs a 3D graphics engine to render said corresponding training images.

13. The system as recited in claim 8 wherein said third processor is further configured to generate said ground truth from said training image definitions expressed in a graphics language.

14. The system as recited in claim 8 wherein said ground truth includes coordinates locating an object of interest in said training images.

15. The system as recited in claim 8 wherein said second and third processors employ parallel processing.

16. The system as recited in claim 8 wherein said second and third processors are cloud servers.

17. The system as recited in claim 8 wherein said first processor is a different processor than said second processor or said third processor.

18. The system as recited in claim 8 wherein said variations are in characteristics of said content.

19. The system as recited in claim 18 wherein said characteristics are selected from the group consisting of:
 ambient lighting level,
 ambient lighting source location,
 size of an object of interest,
 location of an object of interest,
 colors of an object of interest,
 numbers of colors of an object of interest,
 numbers and types of objects, and
 types of background.

20. The system as recited in claim 18 wherein said variations are limited to prevent unrealistic training images.

* * * * *